United States Patent [19]
Argumedo et al.

[11] Patent Number: 5,793,580
[45] Date of Patent: Aug. 11, 1998

[54] MECHANICALLY ACTUATED HEAD CLEANER FOR MAGNETIC TAPE DRIVE

[75] Inventors: Armando Jesus Argumedo; Steven Lloyd Felde; Daniel Stewart Husky, all of Tucson, Ariz.; Kenneth Ray Shelley, Longmont, Colo.

[73] Assignee: International Business Machines Corporation, Armonk, N.Y.

[21] Appl. No.: 665,747

[22] Filed: Jun. 18, 1996

[51] Int. Cl.$^6$ ........................................... G11B 5/41
[52] U.S. Cl. ........................................... 360/128
[58] Field of Search ............................. 360/128, 110, 360/137; 369/71, 72; 15/DIG. 12, DIG. 13, DIG. 14

[56] References Cited

U.S. PATENT DOCUMENTS

| | | |
|---|---|---|
| 3,636,276 | 1/1972 | Rose . |
| 3,881,195 | 4/1975 | Ono et al. ............... 360/128 |
| 3,964,104 | 6/1976 | Herron et al. ............ 360/128 |
| 4,165,526 | 8/1979 | Jones ..................... 360/137 |
| 4,334,656 | 6/1982 | Crawford et al. ......... 242/347 |
| 4,704,647 | 11/1987 | Hino ..................... 360/128 |
| 5,335,128 | 8/1994 | Morinaka ................. 360/128 |
| 5,386,333 | 1/1995 | Kang et al. .............. 360/128 |
| 5,453,894 | 9/1995 | Kim et al. ............... 360/128 |

FOREIGN PATENT DOCUMENTS

| | | |
|---|---|---|
| 0 102 897 | of 0000 | European Pat. Off. . |
| 0 530 837 A1 | 3/1984 | European Pat. Off. . |
| 2423288 | 11/1975 | Germany ............... 360/128 |
| 4216314 | 8/1992 | Japan ................. 360/128 |
| 1780100 A1 | of 0000 | U.S.S.R. . |

*Primary Examiner*—Allen Cao
*Attorney, Agent, or Firm*—Baker Maxham Jester & Meador

[57] ABSTRACT

A mechanically operated cleaning apparatus is provided for a magnetic tape drive of the type which has a tape cartridge transport device. Reciprocal movements of the cartridge transport device actuates movements of the cleaning apparatus which causes a cleaning device, such as a brush, to wipe multiple times across the ABS of a magnetic head to remove debris therefrom. A frame is provided for mounting the magnetic head and the cartridge transport device. A guide apparatus is mounted on the frame and supports the cleaning device for guiding the cleaning device between the first and second lateral locations so that the cleaning device wipes across the ABS as it moves between said locations. An actuator device is mounted on the frame and is connected to the guide apparatus. The actuator device is actuated by reciprocal movements of the cartridge transport device for moving the cleaning device across the ABS to remove debris therefrom. With this arrangement four wiping actions of the cleaning device occur across the ABS during each cycle of the cartridge transport device.

18 Claims, 12 Drawing Sheets

MECHANICALLY ACTUATED HEAD CLEANER FOR MAGNETIC TAPE DRIVE

BACKGROUND OF THE INVENTION

1. Field of the Invention

The present invention relates to a mechanically actuated head cleaner for a magnetic tape drive and more particularly to a mechanically operated head cleaner actuated by reciprocal movement of a tape cartridge transport mechanism in the tape drive.

2. Description of the Related Art

In some magnetic tape drives a transport device translates back and forth to load and unload a tape cartridge with respect to an air bearing surface (ABS) of a magnetic head. The tape is wound on reels in the cartridge which are rotated by spindles in the tape drive. In a load position the transport device positions the tape adjacent the ABS through an opening in the tape cartridge. When the tape moves across the ABS the magnetic head records and plays back information signals on the tape. Typically, the cartridge has tape guides for positioning the tape with respect to the ABS.

The movement of the tape develops an air cushion between the tape and the ABS which causes the tape to be spaced from the ABS a small distance which is called the "flying height". Some magnetic heads are provided with cross slots which extend perpendicularly to the path of the tape for bleeding some of the air from the air cushion to reduce the flying height. As is known, lowering the flying height increases the magnitude of the readback signal.

The magnetic head assembly in a tape drive typically includes at least one of each of a write head, a read head and a servo head. The servo head is connected to servo processing circuitry to servo the position of the write head and/or the read head with respect to a track on the magnetic tape. After processing servo information from a servo track, the servo circuitry feeds signals to an actuator that carries the magnetic head. The actuator then moves the magnetic head perpendicularly to the path of the tape so that accurate positioning of the magnetic head relative to the desired data track can be achieved.

A serious problem in magnetic tape drives is tape debris that accumulates on the ABS of the head assembly. Most of this debris is generated by friction between the magnetic tape and the tape guides in the cartridge and/or the magnetic head. Tape debris can impair performance of the tape drive. If the debris adheres to a read or write head, permanent data errors can occur. The debris can also degrade servo functions and cause improper tracking. Further, the debris can clog the cross slots, causing improper bleeding of air at the ABS and unacceptable altering of the flying height. Sometimes the debris is released from the cross slots in large chunks, which can cause momentary signal drop outs and temporary data errors.

There is a strong felt need for a cleaning apparatus for magnetic tape drives which employ a cartridge transport device. Cleaning apparatuses are available that employ electrical circuitry for sensing when the tape is disengaged from the head and then electrically activating a cleaning element which moves across the ABS to clean the head. However, it would be preferable for a cleaning apparatus to operate mechanically and to be mechanically actuated, in order to reduce the complexity of the electrical circuitry of an existing magnetic tape drive.

SUMMARY OF THE INVENTION

The present invention provides a mechanically operated and actuated cleaning apparatus for a magnetic tape drive of the type which has a cartridge transport device. Reciprocal movements of the cartridge transport device actuate movements of the cleaning apparatus which causes a cleaning device, such as a brush, to wipe across the ABS of the magnetic head to remove debris therefrom. The magnetic tape drive of the present invention includes a frame for mounting the magnetic head and the cartridge transport device. A guide apparatus is mounted on the frame and supports the cleaning device for guiding reciprocal movement of the cleaning device so that the cleaning device wipes across the ABS of the head as it moves between first and second lateral locations. An actuator device is mounted on the frame and is connected to the guide apparatus. The actuator device is activated by the reciprocal movements of the cartridge transport device for moving the cleaning device across the ABS to remove the debris. This arrangement is strictly mechanically actuated and mechanically operated so that electrical circuitry of an existing tape drive does not have to be modified. This arrangement allows for multiple wiping actions of the cleaning device across the ABS during a complete cycle of the tape transport device.

An object of the present invention is to provide a mechanically actuated, mechanically operated cleaning apparatus for cleaning a magnetic head in a magnetic tape drive.

Another object is to provide a mechanically operated head cleaning apparatus for a magnetic tape drive wherein the head cleaning apparatus is mechanically actuated by reciprocal movements of a tape transport apparatus.

A further object is to provide a magnetic head cleaning apparatus which can be employed in an existing magnetic tape drive without the modification of existing electrical circuitry.

Still another object is to provide a head cleaning apparatus which wipes across a magnetic head of a magnetic tape drive four times during a cycle of engagement and disengagement of a magnetic tape with an ABS of the magnetic head.

Other objects and advantages of the invention will be appreciated upon reading the following description taken together with the accompanying drawings.

DESCRIPTION OF THE PREFERRED EMBODIMENTS

Figure 1:
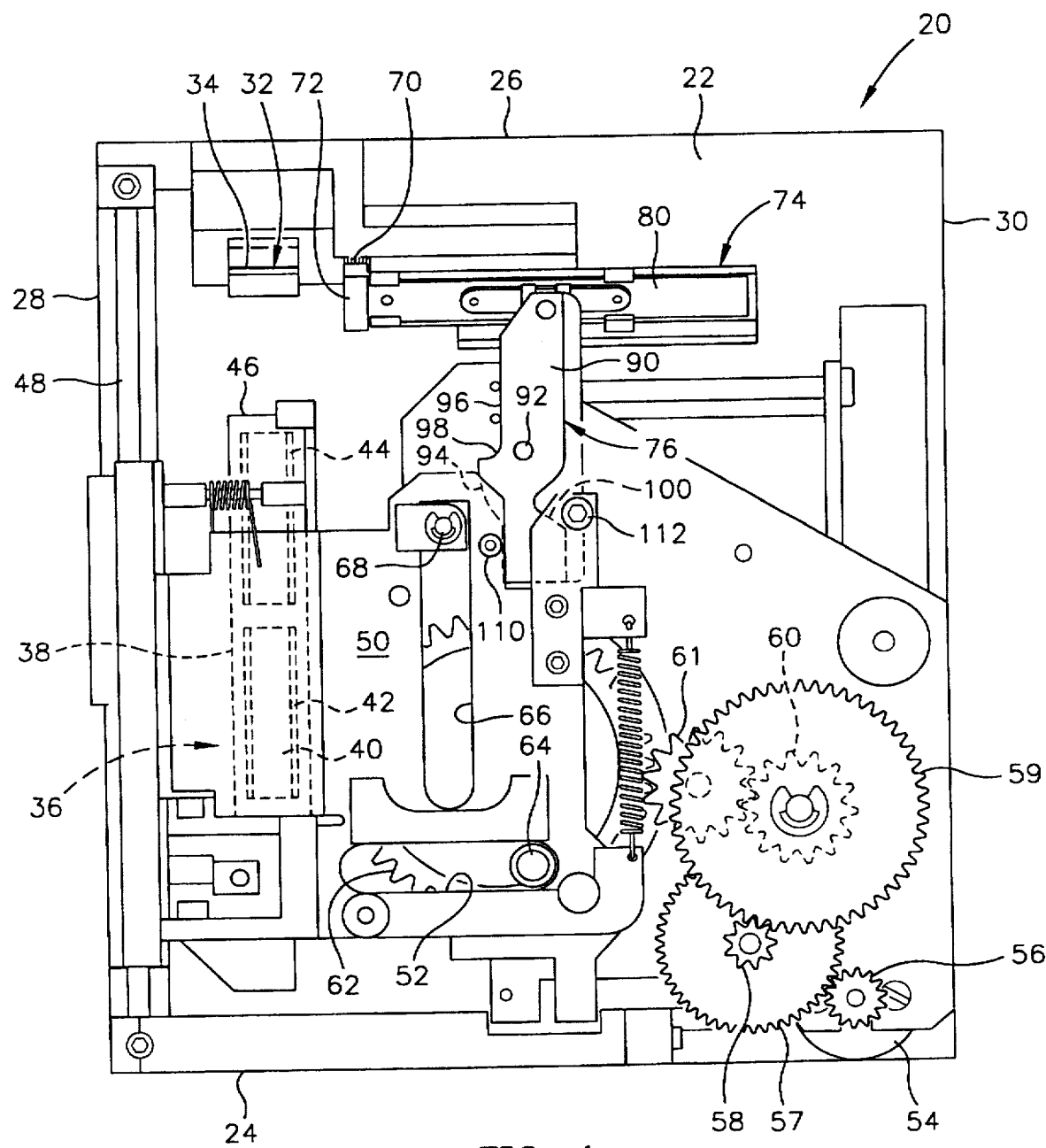
FIG. 1 is a top plan view of a magnetic tape drive wherein a tape cartridge and a brush cleaner are completely withdrawn from a magnetic head at the beginning of a cycle.
Figure 15:
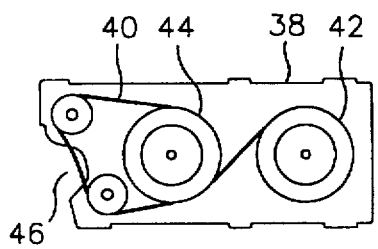
FIG. 15 is a side view of a magnetic tape cartridge with a side portion of the casing removed.

Referring now to the drawings wherein like reference numerals designate like or similar parts throughout the several views there is illustrated in FIG. 1 a magnetic tape drive 20 which has a frame 22, such as a plate. The frame has front and rear ends 24 and 26 and first and second lateral sides 28 and 30. A magnetic head 32 is mounted on the frame, the magnetic head having an air bearing surface (ABS) 34. A cartridge transport device 36 is mounted on the frame for receiving a tape cartridge 38, the tape cartridge containing a magnetic tape 40 which is wound on a pair of reels 42 and 44. The cartridge 38 has an opening 46, as shown in FIGS. 1 and 15, which exposes the magnetic tape to the ABS 34 of the magnetic head 32. The cartridge transport device 36 is also slidably mounted on a rail 48 for moving the tape cartridge reciprocally in forward and rearward directions between forward and rearward locations, the rearward location engaging the magnetic tape 40 with the ABS 34 of the magnetic head through the opening 46. A door, which is part of the cartridge 38, for opening and closing the opening 46, has been omitted for clarity purposes.

The cartridge transport device 36 may include a horizontally-extending plate 50 which has a laterally-extending opening 52. A motor 54, which is mounted to the frame 22, operates through spur gears 57, 58, 59, 60 and 61, which are rotatably mounted to the frame 22, for rotating a ring gear 62 which is also rotatably mounted to the frame. The ring gear 62 carries a vertically-directed pin 64 which extends within the lateral slot 52 so that when the motor 54 is unidirectionally rotated the pin will operate within the lateral slot to reciprocate the plate 50 and the tape cartridge 38 back and forth as mentioned herein-above. The plate 50 also has a fore and aft directed slot 66 which receives a pin 68. The pin 68 is affixed to the frame 22 for riding within the slot 66 to provide additional guidance for fore and aft movements of the cartridge transport device 36.

Figure 3:
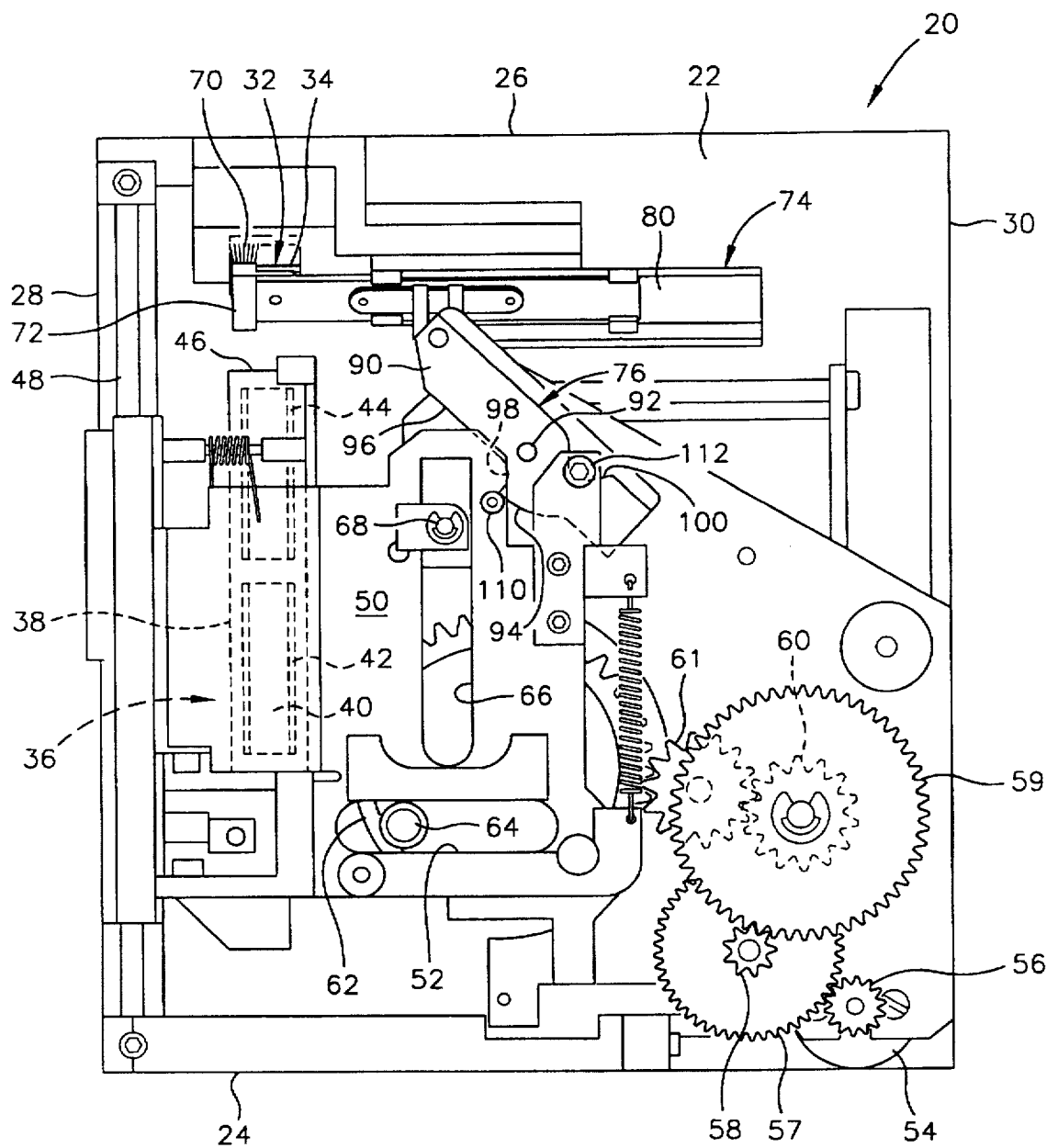
FIG. 3 is the same as FIG. 2 except operation on the first camming surface is complete and the brush cleaner has wiped across the magnetic head.

A cleaning device, such as a brush 70 and a brush holder 72, are provided for wiping particulate matter from the ABS 34 of the magnetic head 32 when the brush 70 is moved thereacross, which will be explained hereinafter. A guide device, which is generally shown at 74, is mounted on the frame 22 and supports the brush holder 72 for guiding the brush 70 in first and second lateral directions between first and second laterally-spaced-apart locations, the first lateral location being shown in FIG. 1 and the second lateral location, as shown in FIG. 3, occurring after the brush 70 has wiped across the ABS 34, which will be explained hereinafter. An actuator device, which is generally shown at 76, is mounted on the frame 22 and is connected to the guide device 74. The actuator device 76 is responsive to forward and rearward movements of the cartridge transport device 36 for moving the brush 70 laterally between the aforementioned first and second laterally-spaced-apart locations to wipe the brush 70 across the ABS 34 to remove particulate matter therefrom. The magnetic head 32 may include a write head (not shown), read head (not shown), and a servo head (not shown). Further, the magnetic head 32 may include laterally-extending slots (not shown) which reduce the flying height of the magnetic tape when it is reeled past the ABS 34. Tape debris will build up after a period of time because of rubbing action between the tape and tape guides (not shown) within the cartridge which will settle on the ABS and within the slots to degrade the performance of the magnetic head 32. The brushing action of the brush 70 will remove this tape debris to improve the performance of the head 32.

Figure 12:
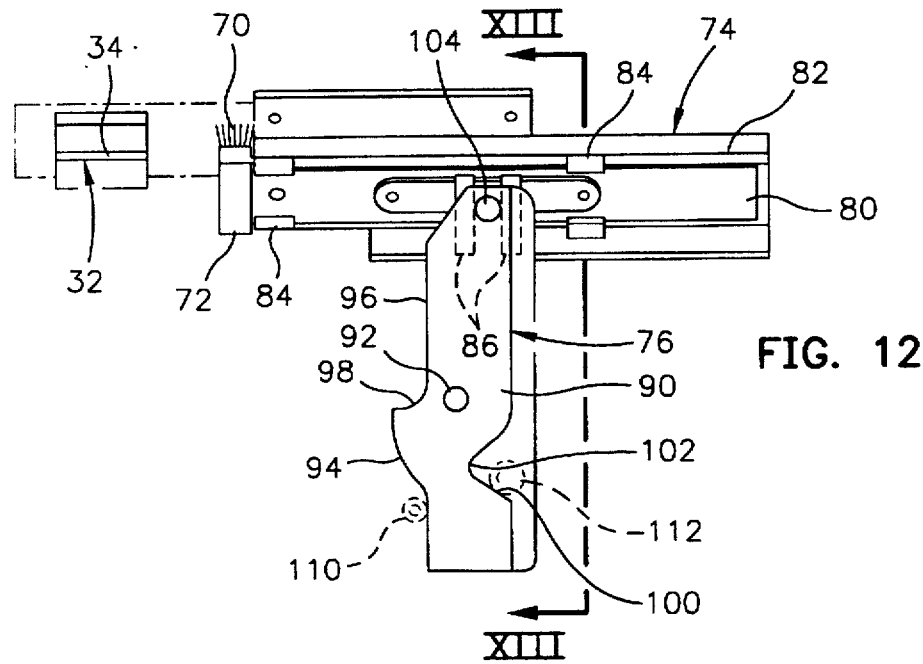
FIG. 12 is a plan view of the magnetic head, the brush cleaner, the guide apparatus for reciprocating the brush cleaner and a camming element for implementing the reciprocatory motion of the brush cleaner.
Figure 13:
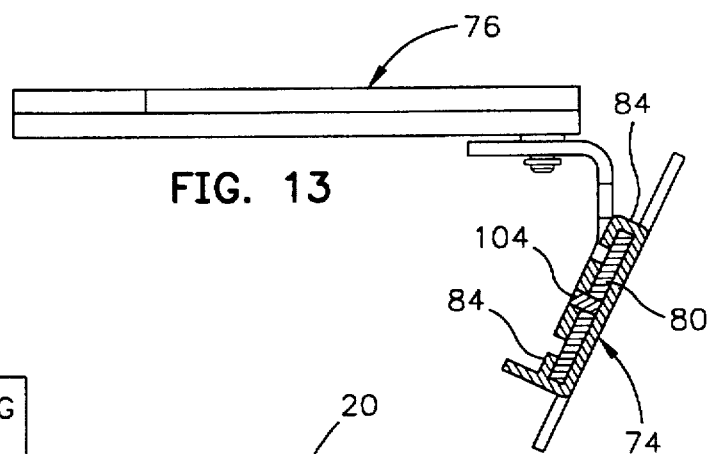
FIG. 13 is a view taken along plane 13—13 of FIG. 12.

The components for implementing cleaning action of the ABS 34 of the magnetic head 32 are more clearly illustrated in FIG. 12. The guide device 74 for the brush holder 72 may include a slider 80 which is slidably mounted on a track 82. As shown in FIGS. 12 and 13, the track 82 may have inwardly-bent tabs 84 for retaining the slider 80 on the track 82. The brush holder 72 is mounted at one end of the slider 80. As shown in FIG. 12, the slider 80 is provided with a pair of spaced-apart elongated tabs 86 which will be described in more detail hereinafter.

The actuator device 76 may include a camming element 90 which is pivotally connected to the frame 22 by a pin 92. The camming element 90 has first, second, third and fourth camming surfaces 94, 96, 98 and 100 respectively. The first, second and third camming surfaces 94, 96 and 98 are located in the first lateral direction from the pivot 92 and the fourth camming surface 100 is located in the second lateral direction from the pivot 92. A first lateral side of the camming element 90 is provided with a recess 102 within which the camming surface 100 is located. At a rearward end of the camming element 90 there is provided an upright pin 104 which is received between the elongated tabs 86 so that the pin 104 can slide fore and aft within the tabs 86 upon movements of the camming element 90 and the slider 80.

As shown in FIG. 1, the plate 50 of the cartridge transport device 36 may be provided with a pair of pins 110 and 112, one on each side of the camming element 90 so that the pin 110 is adapted for operation on the camming surfaces 94, 96 and 98 and the pin 112 is adapted for operation on the camming surface 100. The pins 110 and 112 function as cam followers.

Figure 2:
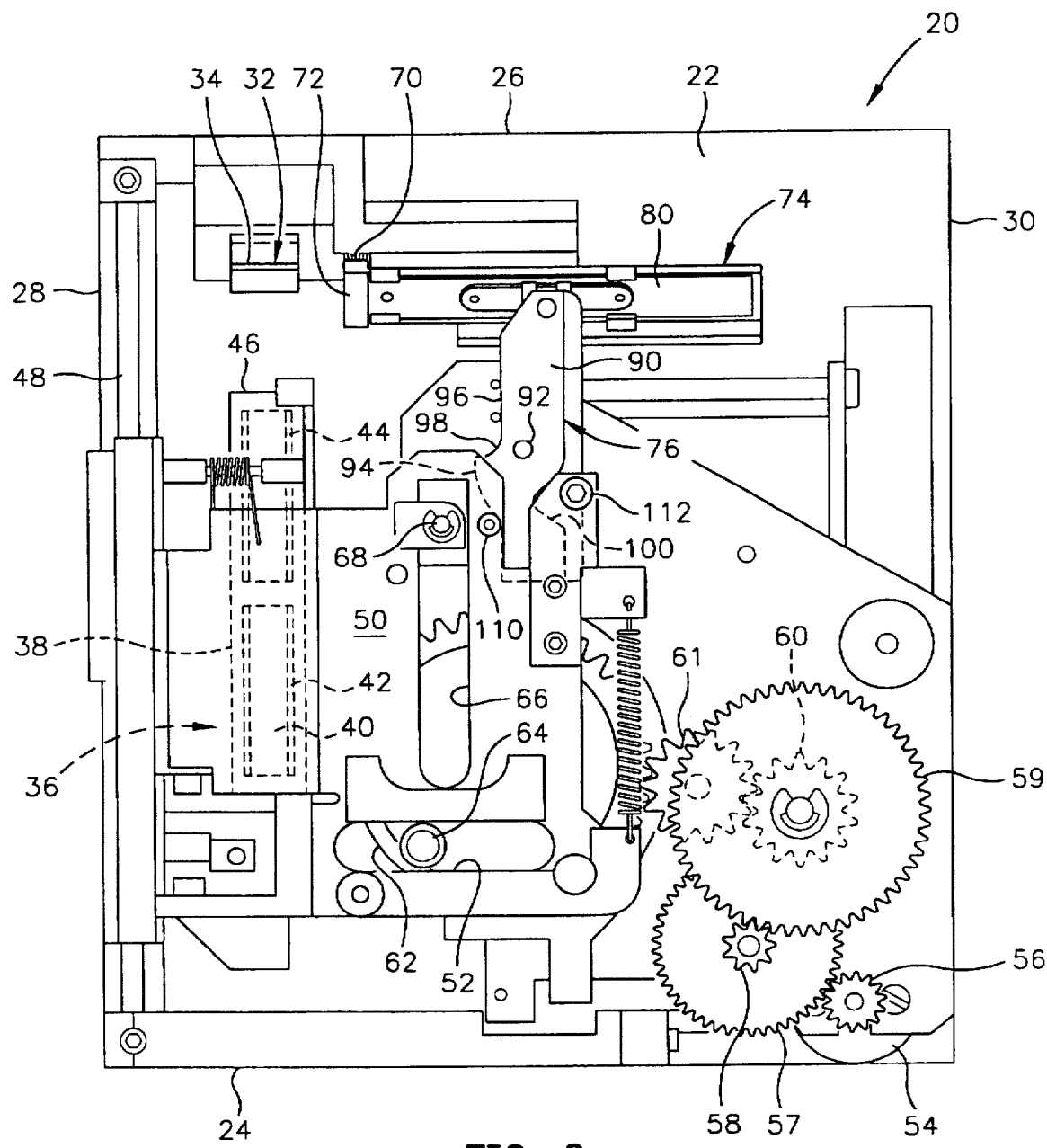
FIG. 2 is the same as FIG. 1 except a first camming surface has been engaged to move a brush cleaner toward the magnetic head.
Figure 4:
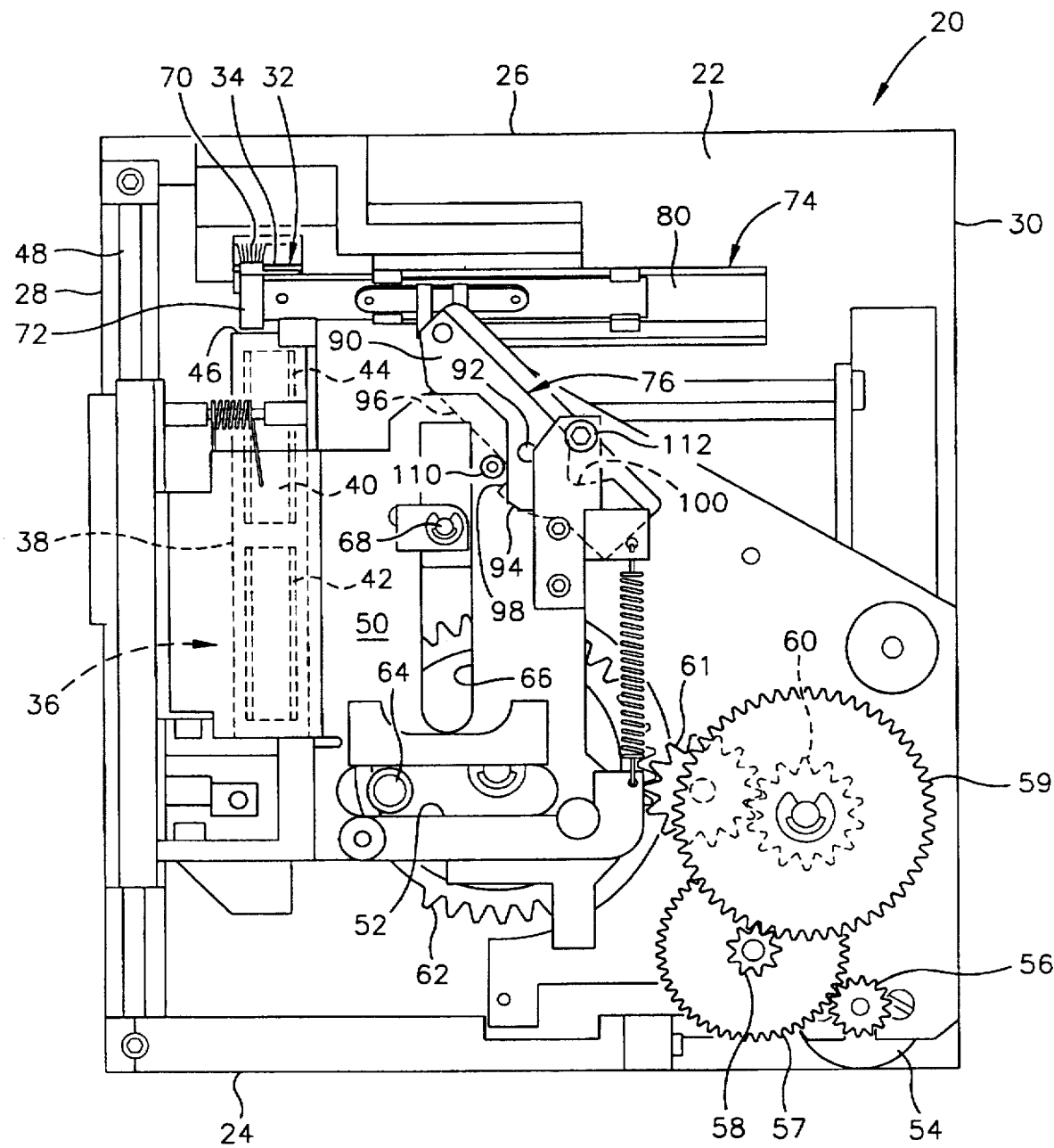
FIG. 4 is the same as FIG. 3 except a second camming surface has been engaged to commence withdrawal of the brush cleaner from the magnetic head.
Figure 5:
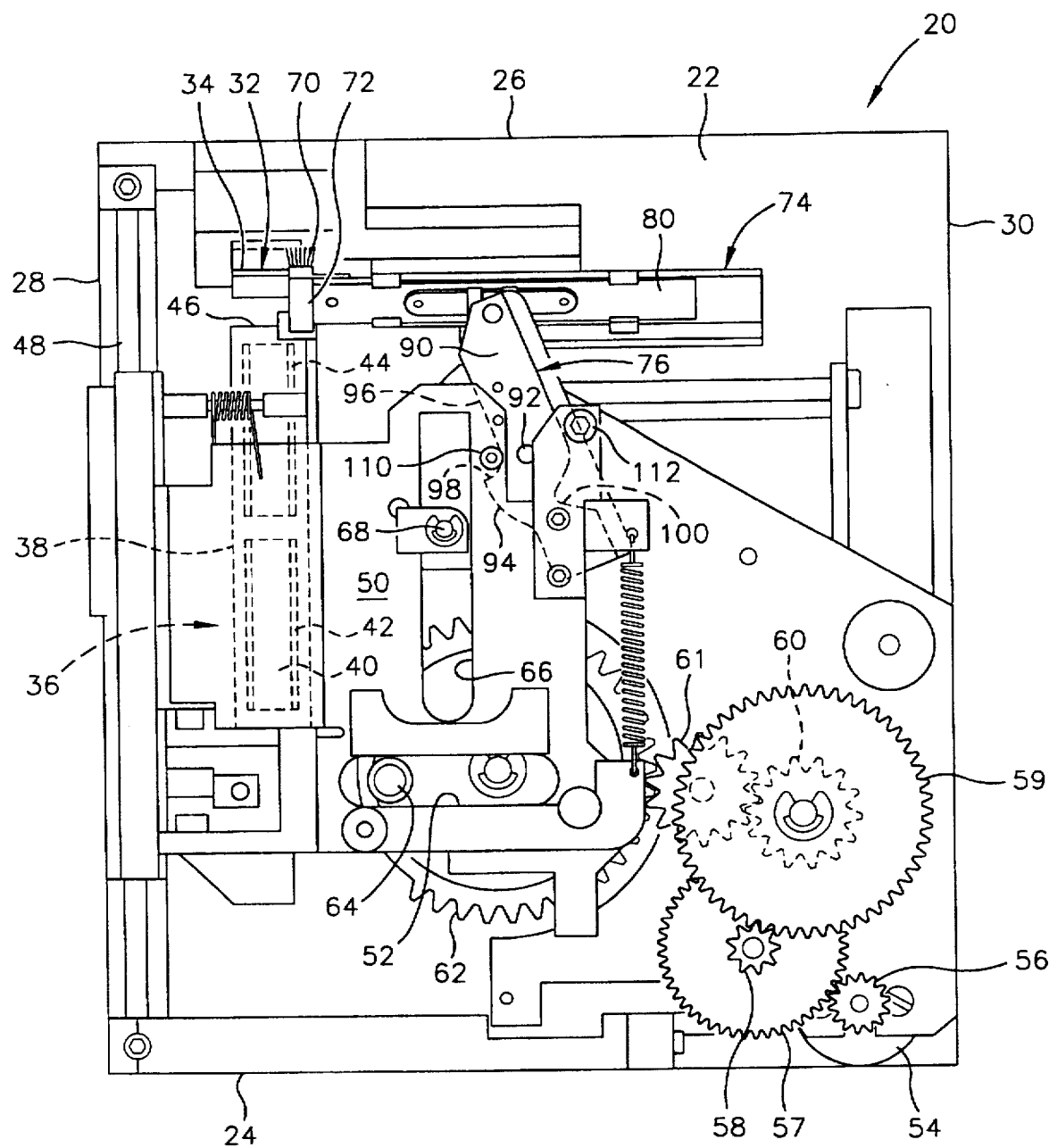
FIG. 5 is the same as FIG. 4 except operation on the second camming surface is more complete continuing the withdrawal of the brush cleaner from the magnetic head.
Figure 6:
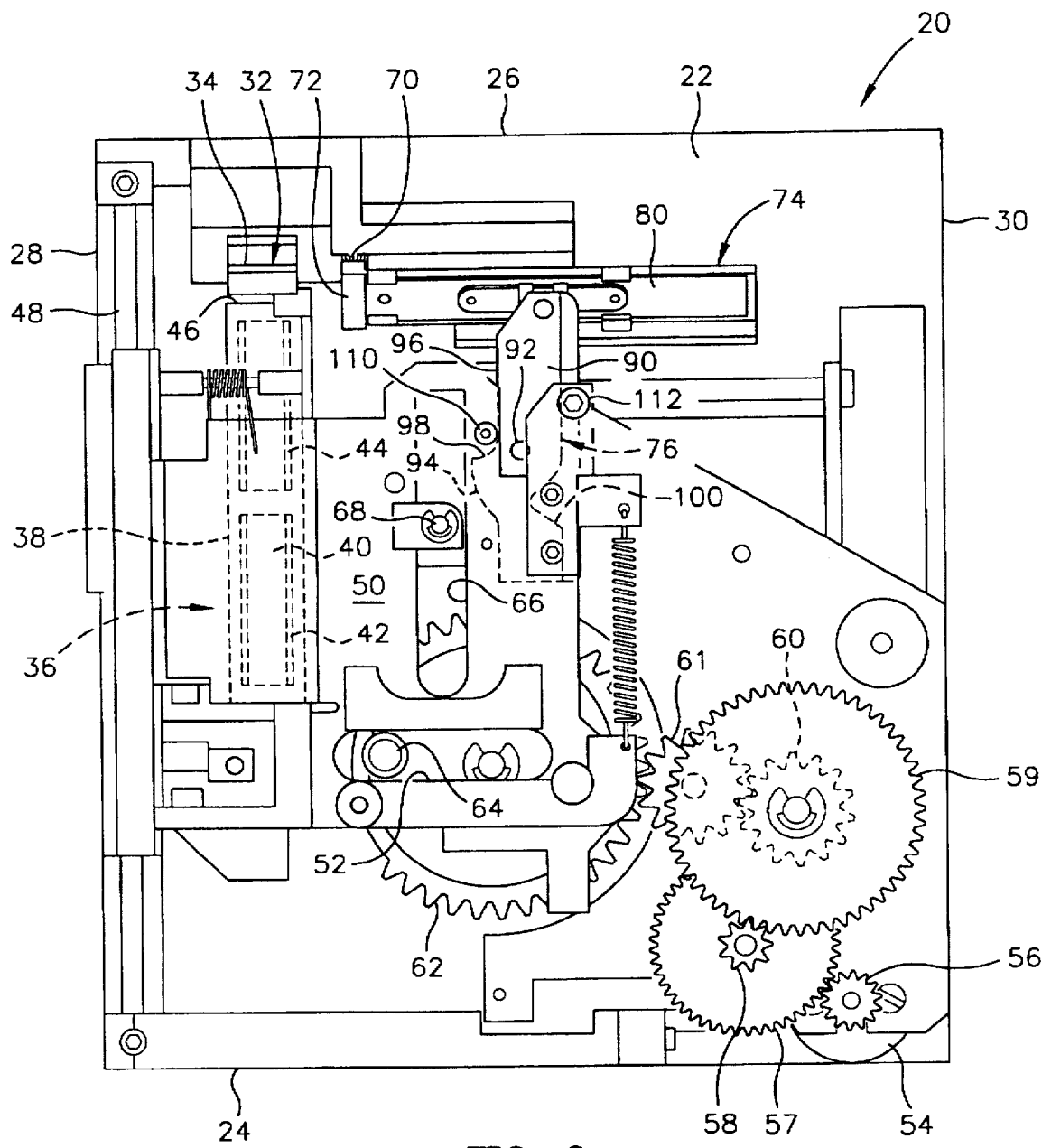
FIG. 6 is the same as FIG. 5 except operation on the second camming surface is complete and the brush cleaner has completely withdrawn from the magnetic head.
Figure 7:
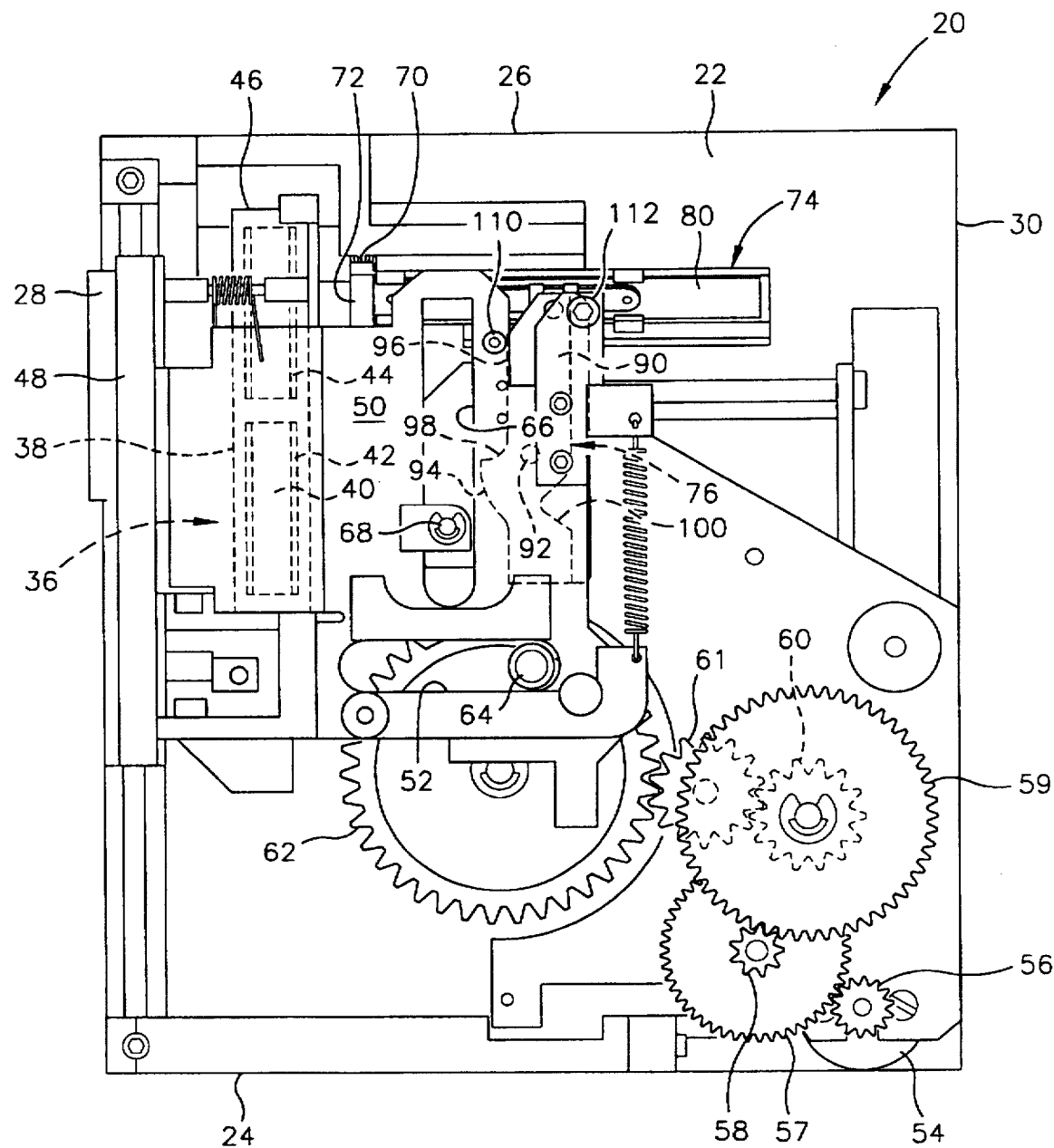
FIG. 7 is the same as FIG. 6 except the tape cartridge has been transported to engage a tape with the magnetic head for recording and playback.

The operation of the magnetic tape drive 20 with the present cleaning apparatus is explained in FIGS. 1–11 which will set forth a complete cycle of movements of the magnetic tape cartridge 38 and the cleaning device 70. In FIG. 1 the tape cartridge 38 and the brush 70 are at a beginning of the cycle in a completely withdrawn position with respect to the magnetic head 32. In this position the pins 110 and 112 have not operated on any camming surfaces. When the motor 54 is operated the pin 64 acts within the slot 52 to advance the plate 50 slightly toward the magnetic head 32 so that the pin 110 has just commenced engaging the camming surface 94, as shown in FIG. 2. As the motor 54 continues to operate the plate 50 advances still further causing the pin 110 to fully operate on the camming surface 94 to rotate the camming element 90 about the pivot 92. This causes the brush 70 to wipe across the ABS 34 to a second lateral location as shown in FIG. 3. As the motor 54 continues to operate the plate 50 is still further advanced causing the pin 110 to act on the camming surface 96. This causes the camming element 90 to be rotated clockwise about the pivot 92 to slightly withdraw the brush 70 from the ABS 34 as shown in FIG. 4. As the motor 54 continues to operate the plate 50 advances still further causing the pin 110 to further act on the second camming surface 96 to further rotate the camming element 90 clockwise to further withdraw the brush 74 from the ABS 34 as shown in FIG. 6. As the motor 54 still continues to operate the plate 50 advances still further to cause the pin 110 to complete its camming action on the second camming surface 96 which rotates the camming element clockwise until the brush 70 has returned to its first lateral location completely withdrawn from the ABS 34 as shown in FIG. 6. As the motor 54 continues to operate the plate 50 advances still further without any camming action until the tape cartridge 38 is brought adjacent the ABS 34 so that the tape 40 has a transducing relationship with the magnetic head 32 as shown in FIG. 7. This now completes one-half of the cycle at which time the brush 70 has wiped across the ABS 34 of the magnetic head 32 two times.

Figure 8:
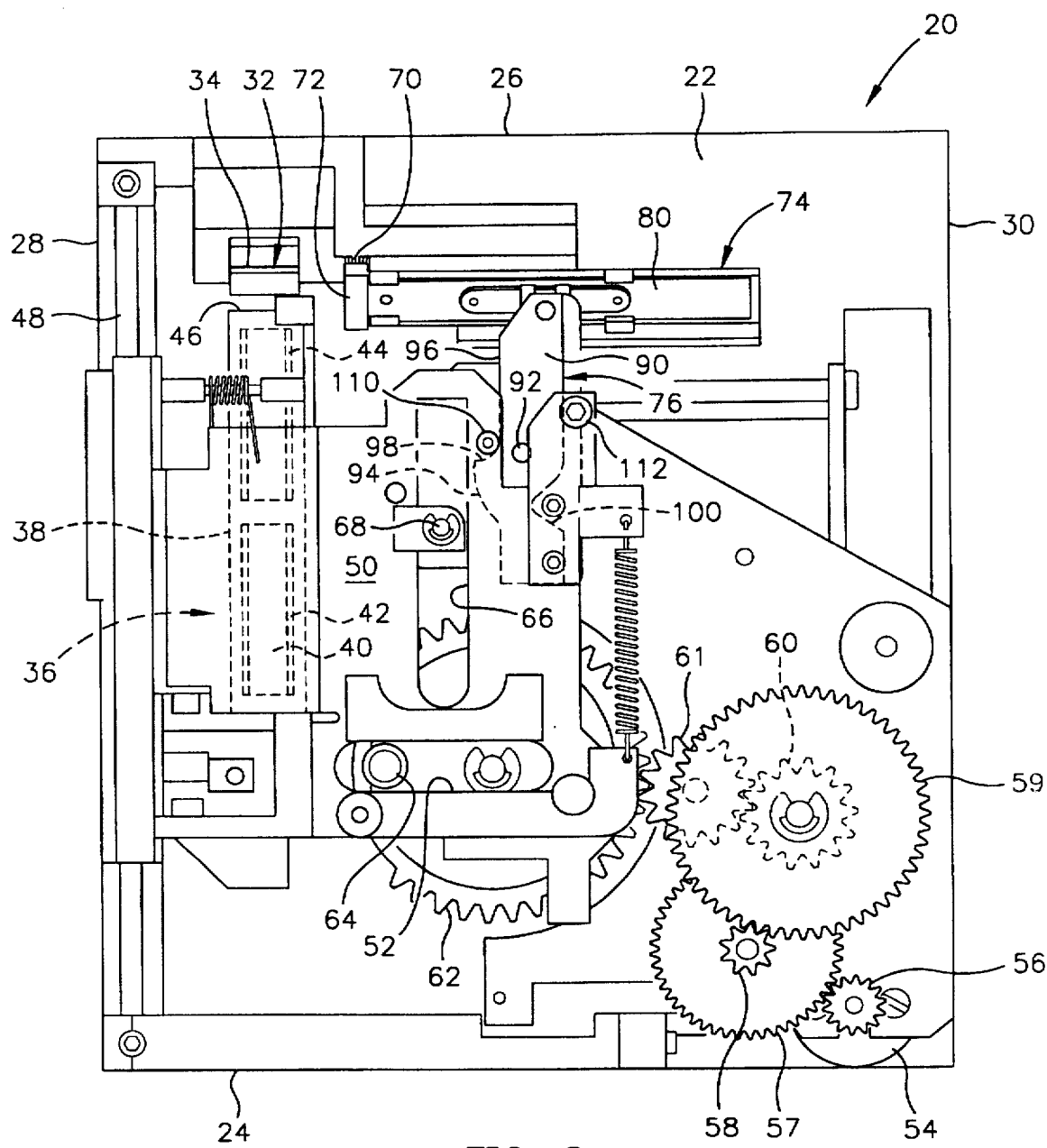
FIG. 8 is the same as FIG. 7 except the tape cartridge has been withdrawn from the magnetic head and engagement with a third camming surface has commenced.
Figure 9:
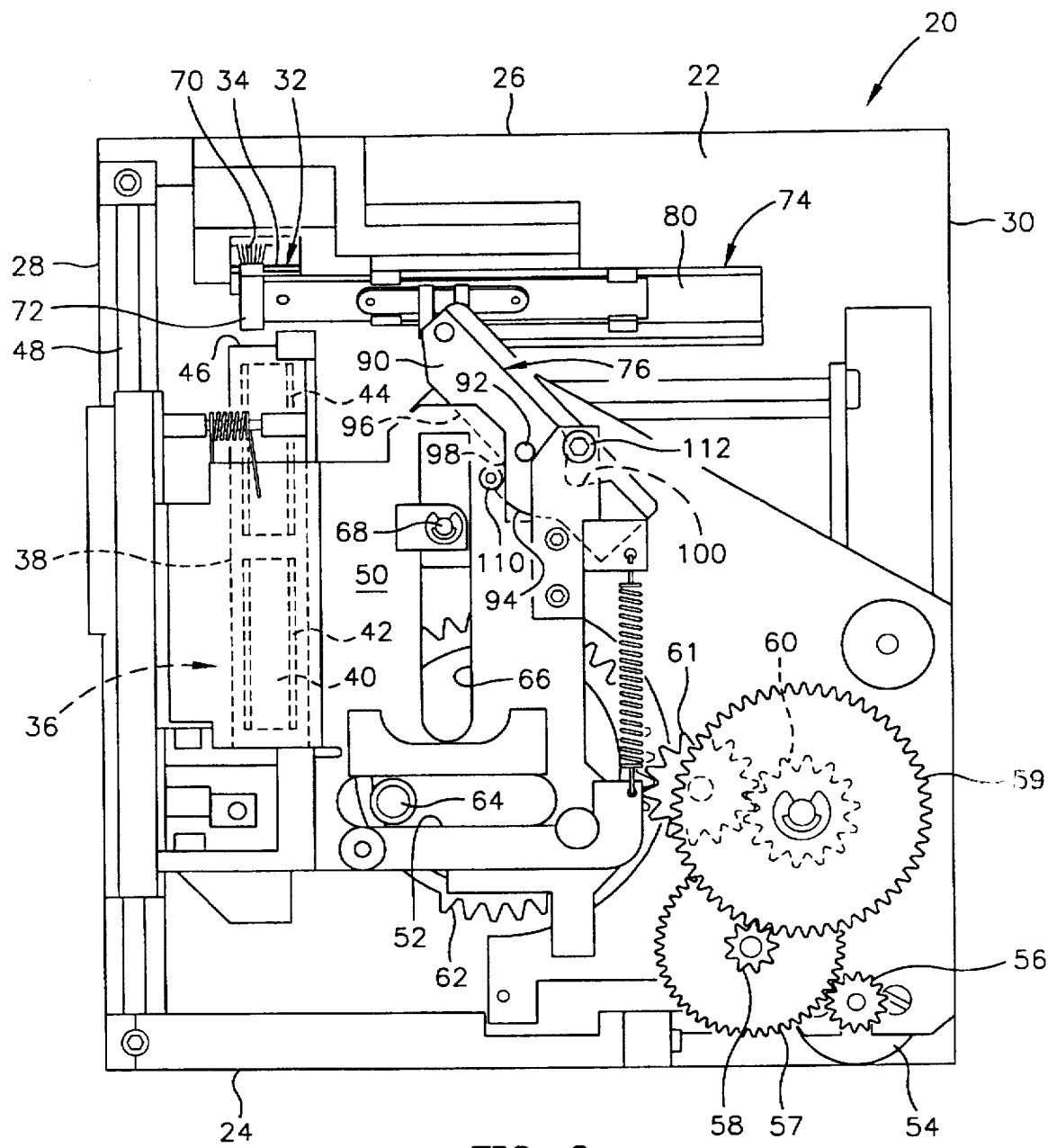
FIG. 9 is the same as FIG. 8 except camming operation of the third camming surface is complete and the brush cleaner has wiped across the magnetic head.
Figure 10:
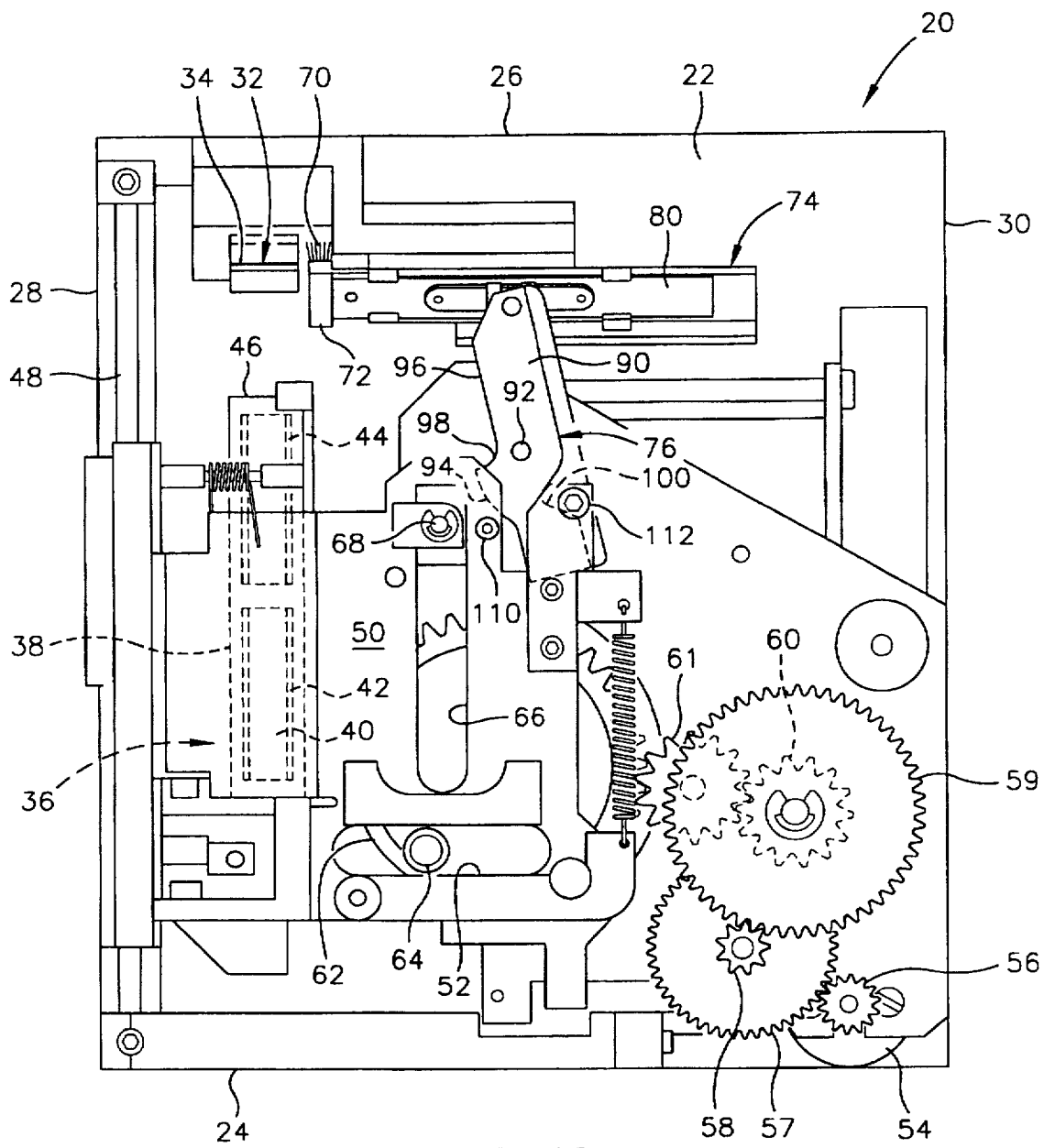
FIG. 10 is the same as FIG. 9 except camming operation of a fourth camming surface has commenced causing the brush cleaner to be withdrawn from the magnetic head.
Figure 11:
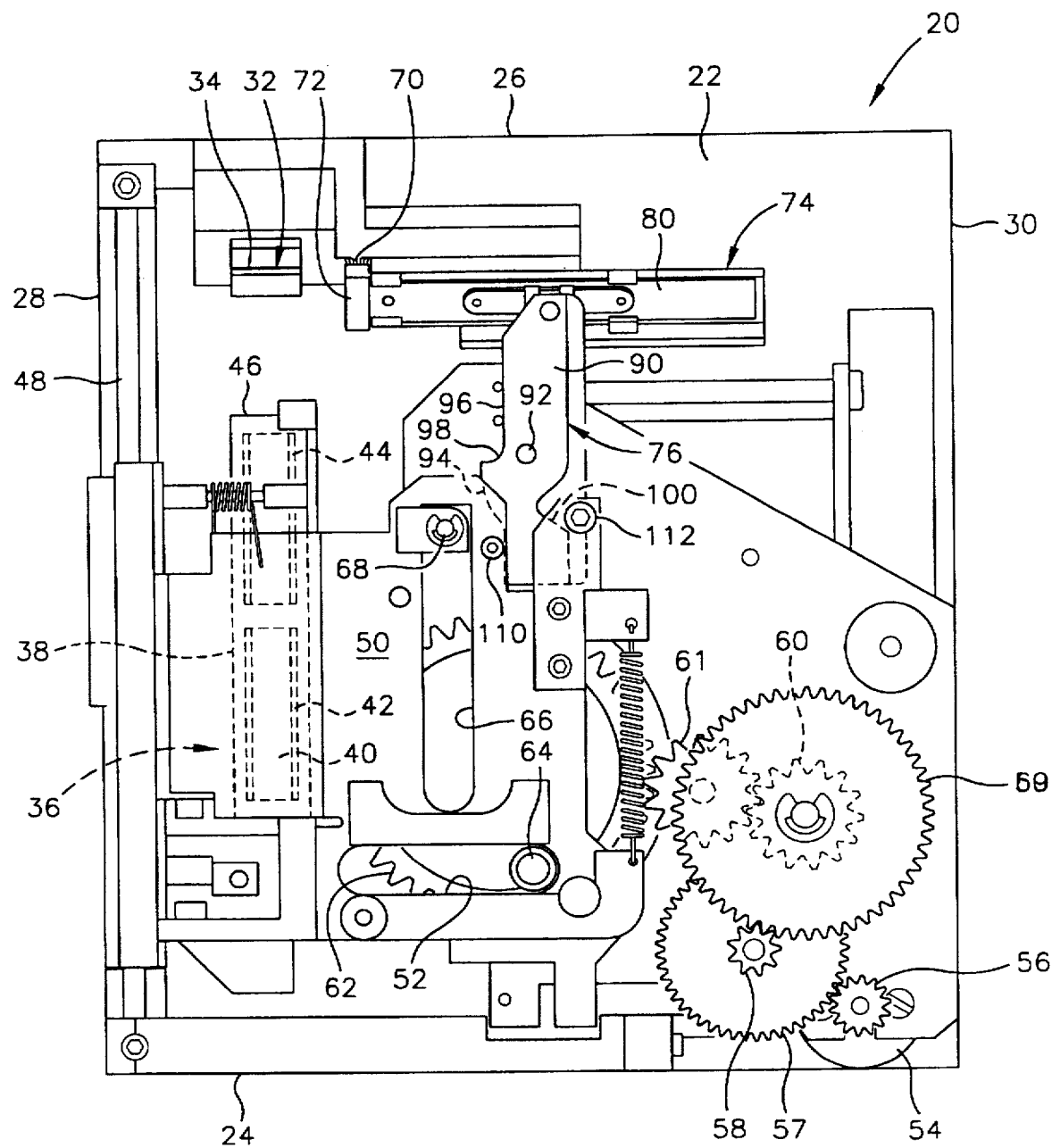
FIG. 11 is the same as FIG. 10 except camming operation of the fourth camming surface is complete and the brush cleaner is completely withdrawn from the head to complete one cycle of operation wherein the brush cleaner has wiped across the magnetic head four times.

The second half of the cycle is explained in FIGS. 8–11. As the motor 54 continues to operate the plate 50 withdraws from the magnetic head 32 causing the pin 110 to commence engagement with the third camming surface 98 as illustrated in FIG. 8. As the motor 54 continues to operate the plate 50 continues to withdraw from the magnetic head causing the pin 110 to act on the camming surface 98 to rotate the camming element 90 counterclockwise to once again wipe the brush 70 across the ABS 34 to the aforementioned first lateral position as shown in FIG. 9. At this time the pin 112 is slightly recessed within the recess 102. As the motor 54 continues to operate the plate 50 is still further withdrawn causing the pin 112 to act on the fourth camming surface 100 as shown in FIG. 10. This causes the camming element 90 to rotate clockwise to partially withdraw the brush from the ABS 34 as shown in FIG. 10. As the motor 54 continues to operate the pin 112 has completed its camming action on the fourth camming surface 100 causing the camming element 90 to continue to rotate clockwise to move the brush 70 to its first lateral location completely withdrawn from the magnetic head as shown in FIG. 11. In this position the cartridge transport 36 is also completely withdrawn from the magnetic head so that FIG. 11 represents a completion of one cycle and has the same appearance as FIG. 1. During the second half of the cycle the brush 70 has once again wiped across the ABS 34 two times. Accordingly, during a complete cycle the brush 70 wipes four times across the ABS 34, two times before the tape 40 is brought into a transducing relationship with the magnetic head 32 and two times after the magnetic tape 40 is brought into said transducing relationship with the magnetic head.

Figure 14:
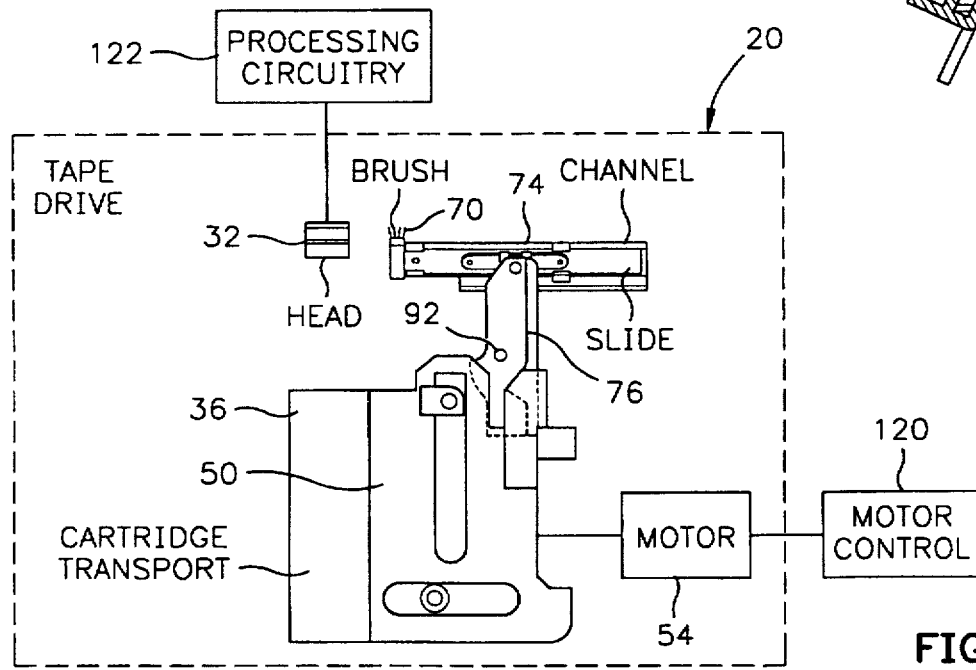
FIG. 14 is a schematic illustration of the magnetic tape drive showing in particular the mechanism for wiping a brush cleaner across the magnetic head.

In FIG. 14 there is shown the tape drive 20 with the cartridge transport device 36, the magnetic head 32, the brush 70, the guide device 74 and the actuator device 76. The motor 54, which moves the plate 50, is controlled by a motor control 120 and signals to and from the magnetic head 32 are processed by processing circuitry 122.

It should be noted that the present invention can be employed without substantially altering an existing magnetic tape drive which employs a cartridge transport device for moving a tape in a cartridge into and out of a transducing relationship with respect to a magnetic head. As shown in FIG. 1 the plate 22 is simply provided with the pins 110 and 112. Also added are the brush 70, the guide device 74 and the actuator device 76. The added components for cleaning the ABS of the magnetic head are entirely mechanically actuated and operated. Further, these components are actuated entirely by normal operation of the magnetic tape drive without modifying existing electrical circuitry of the drive.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic tape drive for processing a tape wound on a cartridge, the cartridge having an opening at a forward end for exposing the tape, comprising:

a frame with two ends;

a magnetic head mounted on the frame, the magnetic head having an air bearing surface (ABS);

a cartridge transport means mounted on the frame for receiving said cartridge and for reciprocally moving the cartridge in forward and rearward directions between first and second locations, the second location locating the tape adjacent the ABS in a transducing relationship with the magnetic head through said opening;

cleaning means for wiping the ABS by being moved thereacross;

guide means supporting the cleaning means on the frame for guiding the cleaning means in first and second lateral directions between first and second laterally spaced apart locations so that the cleaning means wipes across the magnetic head as the cleaning means moves laterally between said first and second laterally spaced-apart locations;

actuator means mounted on the frame and connected to said guide means, the actuator means being responsive to movement of the cartridge transport means for moving the cleaning means laterally between said first and second laterally spaced apart locations to wipe the cleaning means across said ABS;

the actuator means including a camming element and the cartridge transport means including at least one cam follower, the camming element being pivoted to the frame about a pivot axis;

the camming element having a longitudinal axis which intersects said pivot axis and the longitudinal axis being aligned in said forward and rearward directions when the cleaning means is located in said first lateral location;

the camming element having first, second, third and fourth camming surfaces;

the fourth camming surface being laterally spaced from said pivot axis in said second lateral direction and the first, second and third camming surfaces being laterally spaced from said pivot axis in said first lateral direction;

the cartridge transport means having another cam follower so that the cartridge transport means has first and second cam followers; and said first cam follower being laterally spaced from said pivot axis in said first lateral direction and the second cam follower being laterally spaced from said pivot axis in said second lateral direction.

2. A magnetic tape drive for processing a tape wound on a cartridge, the cartridge having an opening at a forward end for exposing the tape, comprising:

a frame with two ends;

a magnetic head mounted on the frame, the magnetic head having an air bearing surface (ABS);

a cartridge transport means mounted on the frame for receiving said cartridge and for reciprocally moving the cartridge in forward and rearward directions between first and second locations, the second location locating the tape adjacent the ABS in a transducing relationship with the magnetic head through said opening;

cleaning means for wiping the ABS by being moved thereacross;

guide means supporting the cleaning means on the frame for guiding the cleaning means in first and second lateral directions between first and second laterally spaced apart locations so that the cleaning means wipes across the magnetic head as the cleaning means moves laterally between said first and second laterally spaced-apart locations;

actuator means mounted on the frame and connected to said guide means, the actuator means being responsive to movement of the cartridge transport means for moving the cleaning means laterally between said first and second laterally spaced apart locations to wipe the cleaning means across said ABS;

the guide means including a laterally extending track and a slider which is slidably mounted on the track for said lateral movement between said first and second lateral locations;

the cleaning means being connected to said slider;

the actuator means including a pin which moves laterally upon movement of the actuator means; and the slider including a retainer which slidably receives said pin so that the pin can move forwardly and rearwardly therein upon movement of the actuator means.

3. A magnetic tape drive for processing a tape wound on a cartridge, the cartridge having an opening at a forward end for exposing the tape, comprising:

a frame with two ends;

a magnetic head mounted on the frame, the magnetic head having an air bearing surface (ABS);

a cartridge transport means mounted on the frame for receiving said cartridge and for reciprocally moving the cartridge in forward and rearward directions between first and second locations, the second location locating the tape adjacent the ABS in a transducing relationship with the magnetic head through said opening;

cleaning means for wiping the ABS by being moved thereacross;

guide means supporting the cleaning means on the frame for guiding the cleaning means in first and second lateral directions between first and second laterally spaced apart locations so that the cleaning means wipes across the magnetic head as the cleaning means moves laterally between said first and second laterally spaced-apart locations;

actuator means mounted on the frame and connected to said guide means, the actuator means being responsive to movement of the cartridge transport means for moving the cleaning means laterally between said first and second laterally spaced apart locations to wipe the cleaning means across said ABS;

the actuator means having a camming element which is pivotally mounted to said frame about a pivot axis;

the camming element having first, second, third and fourth camming surfaces; and the camming element having a recess located rearwardly and laterally in said second lateral direction from said pivot axis;

the fourth camming surface being located within said recess;

the cartridge transport means having first and second cam followers; and the second cam follower being located within said recess when said cleaning means is located at said second lateral location.

4. A magnetic tape drive for processing a tape wound on a cartridge, the cartridge having an opening at a forward end for exposing the tape, comprising:

a frame with two ends;

a magnetic head mounted on the frame, the magnetic head having an air bearing surface (ABS);

a cartridge transport means mounted on the frame for receiving said cartridge and for reciprocally moving the cartridge in forward and rearward directions between first and second locations, the second location locating the tape adjacent the ABS in a transducing relationship with the magnetic head through said opening;

cleaning means for wiping the ABS by being moved thereacross;

guide means supporting the cleaning means on the frame for guiding the cleaning means in first and second lateral directions between first and second laterally spaced apart locations so that the cleaning means wipes across the magnetic head as the cleaning means moves laterally between said first and second laterally spaced-apart locations;

actuator means mounted on the frame and connected to said guide means, the actuator means being responsive to movement of the cartridge transport means for moving the cleaning means laterally between said first and second laterally spaced apart locations to wipe the cleaning means across said ABS;

the cartridge transport means including a plate which has a transversely extending slot;

a ring gear rotatably mounted to said frame;

a pin mounted on the ring gear and extending into said slot so that when the ring gear rotates the pin reciprocates the plate between the first and second locations;

a motor mounted on said frame and having a spur gear which is rotatable by the motor;

the spur gear being connected to the ring gear so that, when the motor rotates the spur gear, the plate is reciprocated between the first location and the second location; and the first and second cam followers being mounted on said plate.

5. A magnetic tape drive for processing a tape wound on a cartridge, the cartridge having an opening at a forward end for exposing the tape, comprising:

a frame with two ends;

a magnetic head mounted on the frame, the magnetic head having an air bearing surface (ABS);

a cartridge transport means mounted on the frame for receiving said cartridge and for reciprocally moving the cartridge in forward and rearward directions between first and second locations, the second location locating the tape adjacent the ABS in a transducing relationship with the magnetic head through said opening;

cleaning means for wiping the ABS by being moved thereacross;

guide means supporting the cleaning means on the frame for guiding the cleaning means in first and second lateral directions between first and second laterally spaced apart locations so that the cleaning means wipes across the magnetic head as the cleaning means moves laterally between said first and second laterally spaced-apart locations;

actuator means mounted on the frame and connected to said guide means, the actuator means being responsive to movement of the cartridge transport means for moving the cleaning means laterally between said first and second laterally spaced apart locations to wipe the cleaning means across said ABS;

the actuator means including a camming element;

the camming element having forward and rearward ends and pivotally connected about a pivot axis intermediate its ends to said frame, the camming element having first, second, third and fourth camming surfaces;

the cartridge transport means having first and second cam followers;

when the cartridge transport means is moving in the first lateral direction, the first cam follower slidably engaging the first camming surface for rotating the camming element counterclockwise about the pivot axis so that the cleaning means moves from its first lateral position to its second lateral position and wipes across said ABS;

when the cartridge transport means continues to move in the first lateral direction, the first cam follower slidably engaging the second camming surface for rotating the camming element clockwise about the pivot axis so that the cleaning means moves from its second lateral position to its first lateral position and wipes across said ABS;

when the cartridge transport means moves in the second lateral direction, the first cam follower slidably engaging the third camming surface for rotating the camming element counterclockwise about the pivot axis so that the cleaning means moves from its first lateral position to its second lateral position and wipes across said ABS; and when the cartridge transport means continues moving in the second lateral direction, the second cam follower slidably engaging the fourth camming surface for rotating the camming element clockwise about the pivot axis so that the cleaning means moves from its second lateral position to its first lateral position and wipes across said ABS.

6. A magnetic tape drive as claimed in 5 wherein:

the guide means includes a laterally extending track and a slider which is slidably mounted on the track for said lateral movement between said first and second lateral locations; and the cleaning means is connected to said slider.

7. A magnetic tape drive as claimed in 6 wherein:

the actuator means includes a pin which moves laterally upon movement of the actuator means; and the slider includes a retainer which slidably receives said pin so that the pin is slidable within said retainer upon movement of the actuator means.

8. A magnetic tape drive as claimed in 5 wherein:

the camming element has a longitudinal axis which intersects said pivot axis and the longitudinal axis is aligned in the first direction and the second direction when the cleaning means is located in said first lateral location;

the fourth camming surface is laterally spaced from said pivot axis in said second lateral direction and the first, second and third camming surfaces are laterally spaced from said pivot axis in a first lateral direction; and the first cam follower is laterally spaced from said pivot axis in said first lateral direction and the second cam follower is laterally spaced from said pivot axis in said second lateral direction.

9. A magnetic tape drive as claimed in 8 wherein:

the second camming surface extends substantially parallel to said longitudinal axis.

10. A magnetic tape drive as claimed in 5 including:

the camming element having a recess located rearwardly and laterally in said second lateral direction from said pivot axis;

the fourth camming surface being located within said recess; and the second cam follower being located within said recess when said cleaning means is located at said second lateral location.

11. A magnetic tape drive as claimed in 5 including:

the first, second and third camming surfaces being contiguous and the third camming surface being located between the first and second camming surfaces.

12. A magnetic tape drive as claimed in 11 wherein:

the second camming surface extends substantially parallel to said longitudinal axis.

13. A magnetic tape drive as claimed in 12 including:

the camming element having a recess located rearwardly and laterally in said second lateral direction from said pivot axis;

the fourth camming surface being located within said recess; and the second cam follower being located within said recess when said cleaning means is located at said second lateral location.

14. A magnetic tape drive as claimed in 13 wherein:

the guide means includes a laterally extending track and a slider which is slidably mounted on the track for said lateral movement between said first and second lateral locations; and the cleaning means is connected to said slider.

15. A magnetic tape drive as claimed in 14 including:

the actuator means having a pin which moves laterally in the first direction and the second direction upon movement of the actuator means; and the slider having a retainer which slidably receives said pin so that the pin can slide within said retainer.

16. A magnetic tape drive as claimed in 15 including:

the cartridge transport means including a plate which has a transversely extending slot;

a ring gear rotatably mounted to said frame;

a pin mounted on the ring gear and extending into said slot so that when the ring gear rotates the pin reciprocates the plate forward and rearward between the first location and the second location;

a motor mounted on said frame and having a spur gear which is rotatable by the motor;

the spur gear being connected to the ring gear so that, when the motor rotates the spur gear, the plate is reciprocated between the first location and the second location; and the first and second cam followers being mounted on said plate.

17. A magnetic tape drive as claimed in 16 including:

said tape cartridge; and said tape cartridge being mounted in said cartridge transport means.

18. A magnetic tape drive as claimed in 17 wherein:

the cleaning means is a brush.

* * * * *